July 10, 1962  E. A. MARRYATT  3,043,399
FLEXIBLE LADDER

Filed April 7, 1961  2 Sheets-Sheet 1

INVENTOR.
EARL A. MARRYATT
BY Gusta Drews
his ATTORNEY

July 10, 1962  E. A. MARRYATT  3,043,399
FLEXIBLE LADDER

Filed April 7, 1961  2 Sheets-Sheet 2

INVENTOR.
EARL A. MARRYATT
BY
his ATTORNEY

United States Patent Office 3,043,399
Patented July 10, 1962

3,043,399
FLEXIBLE LADDER
Earl A. Marryatt, 190 Demarest Ave., Closter, N.J., assignor of fifty percent to Alexander C. Kidd, South Orange, N.J.
Filed Apr. 7, 1961, Ser. No. 101,389
3 Claims. (Cl. 182—196)

This invention relates to flexible ladders in general such as Jacob's-ladders, multiple ladders and the like, particularly those adapted for use on sea going vessels and the like such as disclosed in my copending application for patent Serial No. 746,439, filed July 3, 1958, now Patent No. 2,985,254, granted May 23, 1961.

Among the objects of the present invention it is aimed to provide an improved flexible ladder which can be folded into a compact package for storage in the interest of conserving space on vessels and the like, where space is at a premium, such as submarines, combat vessels, and even aircraft carriers.

It is still another object of the present invention to provide a flexible ladder having stiles or stringers which are non-corrosive to sea air and will withstand extreme weather conditions such as are encountered by sea going vessels in the Arctic as well as in the tropics, which are in turn easy to handle without the risk of injury to the bare skin of users, such as the risk which is at present encountered with metal in extreme temperatures, which are substantially non-inflammable, and which, furthermore, have a breaking point of at least 4500 pounds.

More specifically, it is an object of the present invention to provide a flexible ladder having stiles composed of a webbing consisting of woven threads of nylon impregnated with latex such as is commercially sold by Essex Mills of Pawtucket, Rhode Island, as nylon webbing, which threads are ostensibly endless as compared to the short fibers of sisal and hemp, and therefore particularly adapted for webbing strips used as stiles or stringers.

It is still another object of the present invention to provide a flexible ladder having stiles composed of a webbing consisting of woven threads of nylon or the like having openings extending through the same to form loops in turn to receive the ends of rungs preferably tubular and composed of a rigid material such as aluminum, having pairs of plates or brackets extending around the stile portions which receive the ends of the rungs, the ends of said plates extending beyond said stiles, and rivets extending through said ends of the plates and the rungs to anchor the plates in place and in turn the rungs from turning relative to said stiles.

It is still a further object of the present invention to provide a flexible ladder having stiles composed of a webbing consisting of woven threads of nylon or the like having openings extending through the same to form loops in turn to receive the ends of rungs preferably tubular and composed of a rigid material such as aluminum, having pairs of plates or brackets extending around the stile portions which receive the ends of the rungs, the ends of said plates extending beyond said stiles, and rivets extending through said ends of the plates and the rungs to anchor the plates in place and in turn the rungs from turning relative to said stiles, all as aforesaid equipped with spacing disks at the ends of the rungs, which disks have associated therewith tubular extensions which fit into the ends of said rungs in turn to be connected by one of said rivets to said rungs.

It is still another object of the present invention to provide an improved multiple ladder consisting of a plurality of stringers composed of nylon fabric or the like having pockets therein to receive rungs extending transversely through the pockets in said stringers and brackets for connecting the several stringers to said rungs.

It is a further object of the present invention to provide an improved multiple ladder consisting of a plurality of stringers consisting of nylon or the like having pockets therein to receive rungs in staggered relation to one another with reinforced strips along some of said stringers to present an effective grip to the users of the ladders and loops along the lower ends of the outer stringers to facilitate gripping and holding the lower end of the ladder in the landing barge or station while embarking or disembarking.

These and other features, capabilities, and advantages of the invention will appear from the detailed description of specific embodiments thereof illustrated in the accompanying drawings in which:

FIG. 1 is a fragmental front elevation of one embodiment of the invention characterized by plates extending around the portions of the stiles which receive the ends of the rungs, spacing disks having extensions extending into the ends of said rungs, and rivets anchoring said plates and said extensions and thereby said disks to said rungs and thereby in turn anchoring said rungs against rotation relative to said stiles.

Figure 1:
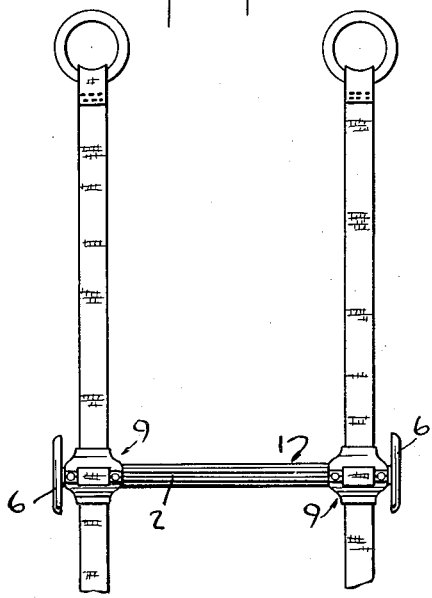

In the embodiment illustrated in FIGS. 1, 2, 3 and 4 the rungs 1 having flutes or grooves 2 extend through the openings 3 formed by the loops 4 in the stringers 5 which are composed of woven threads of nylon or the like. The loops 4 of the stringers 5 preferably receive the rungs 1 adjacent the ends of the rungs 1 as shown in FIG. 1 for a single or Jacob's ladder. If the ladder is equipped with spacing disks such as the disks 6, these disks 6 preferably are equipped with tubular extensions 7 which are conformed to and snugly fit in the ends of the rungs 1.

Excellent results have been achieved when the diameter of the disks 6 is about 5 inches when used with rungs 1 that are about one inch, 1⅛ inch or 1¼ inch, depending upon the lengths of the rungs 1.

Figure 2:
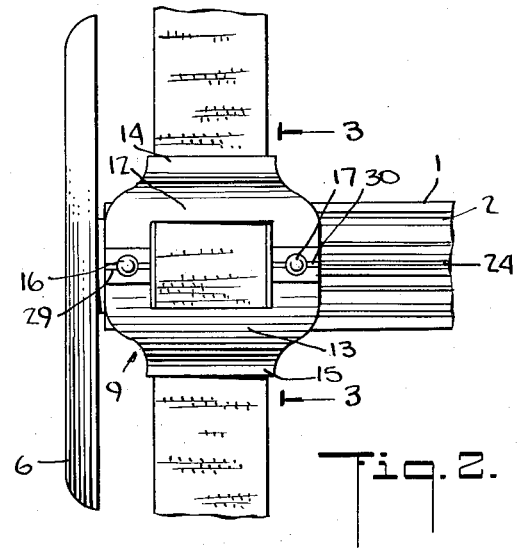
FIG. 2 is a front elevation of an enlarged fragmental portion of the embodiment illustrated in FIG. 1.

The three elements, to wit, the stringers 5, rungs 1 and disks 6 are connected to one another so that the rungs and disks will not turn or rotate relative to the stringers or to one another. These anchoring means in the present instance consist of pairs of plates or brackets 8 and 9 preferably in skeleton form as shown, each having two arcuate cross pieces 10 and 11 and two end cross pieces 12 and 13 connecting the arcuate cross pieces to one another with the end cross pieces extending longitudinally or axially of the rungs. Preferably the end cross pieces 12 and 13 terminate in the thickened ends 14 and 15 respectively. The arcuate cross pieces 10 and 11 are spaced from one another a distance sufficient preferably to receive the width of a stringer 5 between them as shown in FIGS. 1 and 2, which arrangement enables the metal of the brackets 8 and 9 snugly to engage the metal of the rungs 1 and avoid any variation in the fit that might result if the fibrous stringer 5 was disposed between the rungs 1 and the brackets 8 and 9.

The opposing arcuate cross pieces 10 and 11 of each pair of brackets 8, 9 are connected to one another by the rivets 16, 17. The outer rivet 16 of each pair disposed between a disk 6 and a stringer 5, see FIGS. 1, 2 and 3, extends not only through the opposing arcuate cross pieces 10 of the brackets 8 and 9 but also through the rung 1 and the tubular extension 7 of the disk 6, whereas, the inner rivet 17 extends only through the opposing arcuate cross pieces 11 of the brackets 8 and 9 and through the rung 1.

Figure 3:
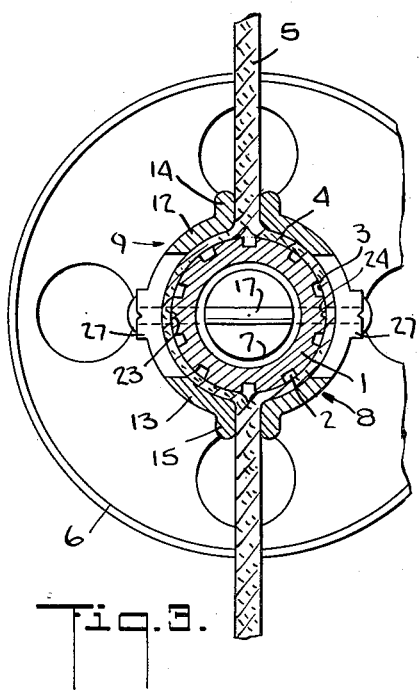
FIG. 3 is a section on the line 3—3 of FIG. 2.
Figure 4:
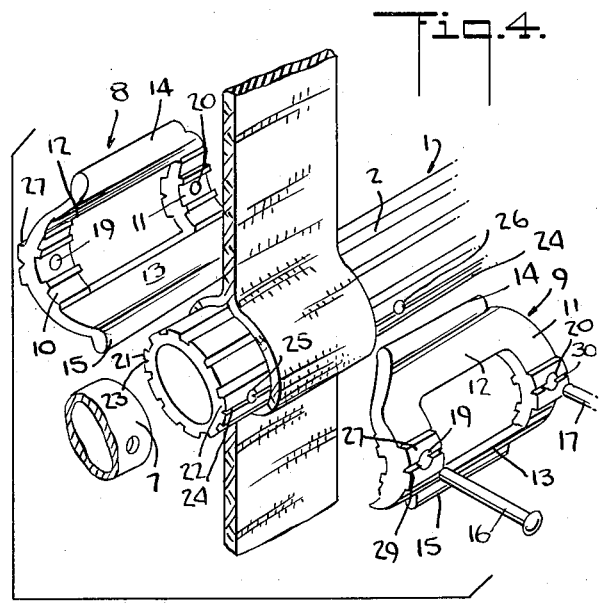
FIG. 4 is a fragmental exploded view of parts of the embodiment illustrated in FIG. 2.

In order to anchor the brackets 8 and 9 against rotation with the rungs 1, the inner faces of the arcuate cross pieces 10 and 11 with longitudinally extending ribs 18 spaced apart to conform to the distances of the grooves 2 in the rungs 1 in order to fit into the same as shown in FIG. 3. To facilitate positioning the brackets 8 and 9 in line so that diametrically opposite areas of the rung 1 will register with the openings 19 and 20 in the brackets 8 and 9 which receive the rivets 16 and 17, the raised portions 21 and 22 in the rungs 1 are provided with medial grooves 23 and 24 respectively in which medial grooves 23 and 24 the rivet receiving openings 25 and 26 are formed.

Preferably the raised portions 27 and 28 of the brackets 8 and 9 through which the rivet openings 19 and 20 extend are also provided with longitudinally extending grooves 29 and 30 respectively to facilitate positioning the rivets 16 and 17 and in turn also in alining the rivet openings 19 and 20 of the brackets 8 and 9 with the rivet openings 25 and 26 in the rungs 1.

The openings 3 forming the loops 4 in the stringers 5 conform to the periphery of the rungs 1 so that the loops 4 snugly fit the rungs 1 as shown in FIG. 3.

Figure 5:
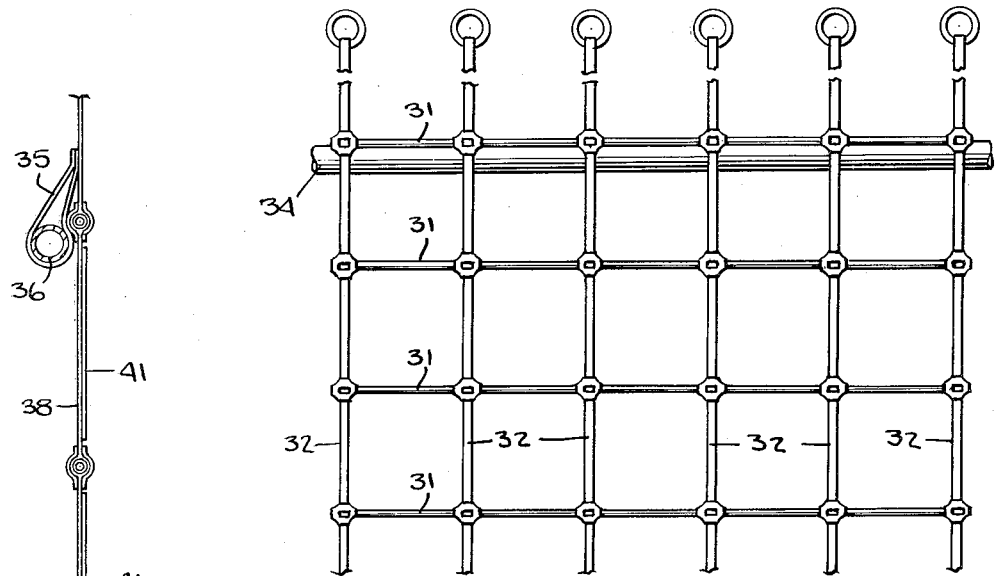
FIG. 5 is a plan of one embodiment of the multiple ladder made according to the present invention.

In the embodiment shown in FIG. 5, a multiple ladder is disclosed which distinguishes from the embodiment illustrated in FIGS. 1 to 4 inclusive primarily in that the rungs 31 are continuous and extend as illustrated in FIG. 5 across six stringers 32. Otherwise the bracket 33 conforms substantially to the brackets 8 and 9 for connecting the rungs 31 to the stringers 32. In another respect instead of the spacing disks 6, a spacing boom 34 is provided consisting of a hollow aluminum tube 34 which is connected to the stringers 32 by loops such as the loops 35 of the embodiment illustrated in FIG. 7 which latter carries the tubular boom 36.

Figures 6, 7:
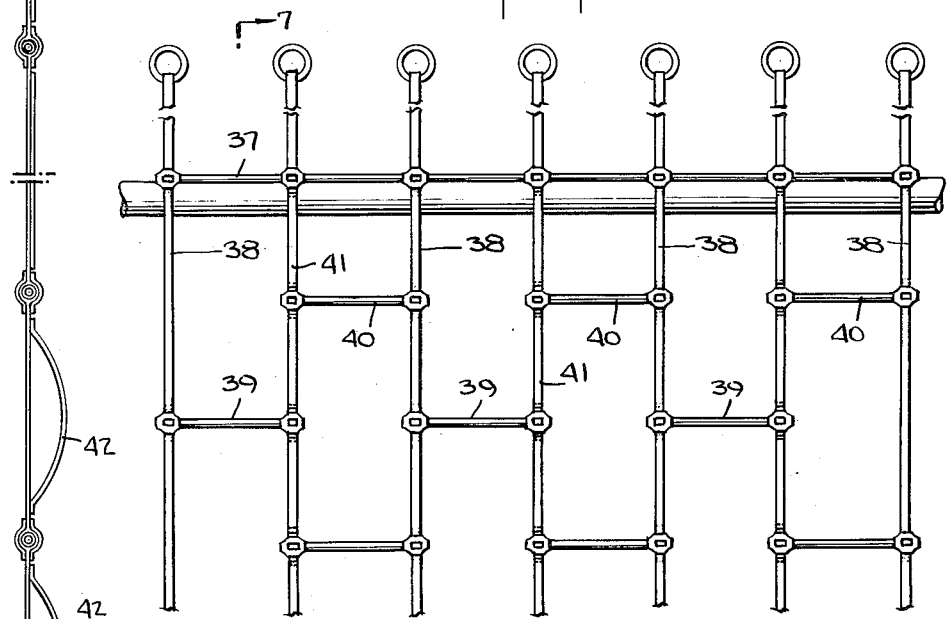
FIG. 6 is a plan of another embodiment of a multiple ladder made according to the present invention.
FIG. 7 is a section on the line 7—7 of FIG. 6.

The embodiment illustrated in FIG. 6 differs from the embodiment illustrated in FIG. 5 in that only the uppermost rung 37 is continuous being connected to a plurality of stringers 38, seven in number. All of the rungs 39 below the uppermost rung 37 in the embodiment illustrated in FIG. 6, to wit, the rungs 39 of the first, third and fifth group, are staggered relative to the rungs 40 of the second, fourth and sixth group. In this embodiment, the second fourth and sixth stringers 38 counting from the left between successive rungs, to wit, from 37 to 40 and from 40 to 39 are provided with an extra thickness of nylon webbing as shown in FIG. 7 such as the thickness 41.

Aside from the foregoing the lowermost two sections of the outermost stringers 38 between successive rungs 39 on the left and successive rungs 40 on the right are provided with loops such as the loops 42 to enable attendants in the landing barge or station to grip the loops 42 and draw the lower end of the multiple ladder into the landing barge or station.

It is obvious that various changes and modifications may be made to the details of construction without departing from the general spirit of the invention as set forth in the appended claims.

I claim:

1. In a ladder, the combination of rigid tubular rungs, stiles composed of fabrics webbing strips having integrally woven loops to receive the ends of said rungs, two metal plates embracing said rungs with said loops intermediate said plates and said rungs, and rivets extending through said two plates and rungs and connecting said plates and stiles to said rungs, said rungs having outer longitudinally extending grooves, said plates having arcuate cross pieces positioned beyond the edges of said stiles with openings in said plates to clear said stiles, and longitudinally inwardly extending ribs in said arcuate cross pieces to fit directly into said grooves, said rivets extending through said arcuate cross pieces and rungs and secured in place to effect a snug engagement between said rungs and arcuate cross pieces, there being alined grooves and openings in said rungs and arcuate cross pieces to receive said rivets.

2. The combination as set forth in claim 1 in which there are a plurality of stiles spaced from one another to form a multiple ladder, in which only the uppermost row are in alinement and integral with one another to maintain the individual units of said ladder spread apart during use, the rungs below said uppermost row of two adjacent groups are staggered relative to one another, and strips of webbing secured to the stile of two adjacent staggered rows of rungs to form a double thickness of webbing for the user to grip when embarking or disembarking.

3. The combination as set forth in claim 1 in which there are a plurality of said stiles spaced from one another to form a multiple ladder, in which the rungs are in alinement and integral with one another, a spacing boom disposed immediately below said uppermost integral row of rungs and strips of webbing securing said spacing boom to the rear faces of said stiles.

References Cited in the file of this patent

UNITED STATES PATENTS

| | | |
|---|---|---|
| 192,403 | Allen | June 26, 1877 |
| 266,062 | Spencer | Oct. 17, 1882 |
| 376,034 | Hughes | Jan. 3, 1888 |
| 836,432 | Bryant | Nov. 20, 1906 |
| 2,171,863 | Pirsch | Sept. 5, 1939 |
| 2,370,728 | Hopp et al. | Mar. 6, 1945 |
| 2,385,824 | Margolin et al. | Oct. 2, 1945 |
| 2,885,132 | Campbell | May 5, 1959 |
| 2,985,254 | Marryatt | May 23, 1961 |